P. MEYER.
APPARATUS FOR PRINTING, REGISTERING, AND ISSUING TICKETS.
APPLICATION FILED JAN. 3, 1912.

1,143,424.

Patented June 15, 1915.
6 SHEETS—SHEET 1.

Witnesses:
Margaret McGathen
G. Manning

Inventor,
Peter Meyer
by Howson & Howson
his Attorneys.

P. MEYER.
APPARATUS FOR PRINTING, REGISTERING, AND ISSUING TICKETS.
APPLICATION FILED JAN. 3, 1912.

1,143,424.

Patented June 15, 1915.
6 SHEETS—SHEET 2.

P. MEYER.
APPARATUS FOR PRINTING, REGISTERING, AND ISSUING TICKETS.
APPLICATION FILED JAN. 3, 1912.

1,143,424. Patented June 15, 1915.
6 SHEETS—SHEET 5.

P. MEYER.
APPARATUS FOR PRINTING, REGISTERING, AND ISSUING TICKETS.
APPLICATION FILED JAN. 3, 1912.

1,143,424.

Patented June 15, 1915.
6 SHEETS—SHEET 6.

UNITED STATES PATENT OFFICE.

PETER MEYER, OF COLOGNE-NIPPES, GERMANY.

APPARATUS FOR PRINTING, REGISTERING, AND ISSUING TICKETS.

1,143,424. Specification of Letters Patent. Patented June 15, 1915.

Application filed January 3, 1912. Serial No. 669,265.

*To all whom it may concern:*

Be it known that I, PETER MEYER, a subject of the Emperor of Germany, and residing at Cologne-Nippes, Germany, have invented certain new and useful Improvements in Apparatus for Printing, Registering, and Issuing Tickets, of which the following is a specification.

The present invention relates to apparatus for printing, registering and issuing tickets and the object of my invention is to provide an improved device of this nature possessing the characteristics hereinafter mentioned.

The present ticket printing apparatus is particularly designed for street car conductors and among its features of improvement over prior devices of this character may be mentioned its ready manipulation, compactness and lightness. For this purpose according to this invention a number of printing mechanisms are arranged in a rotary drum and the adjustment of the printing mechanisms for the particular indications to be printed such for example as the place where a passenger should get down the transfer station, the time, the direction, fare, etc., as well as the actuation of the operating mechanism of the several counting mechanisms which serve for registration of the facts it is desired to register are effected from the shaft of the printing mechanism drum.

Conveniently mounted upon the drum shaft at one or both sides of the apparatus are adjusting or setting knobs bearing suitable inscriptions and by the adjustment of which the printing mechanisms are set for the particular indications to be printed and the devices for actuating the counting mechanisms are automatically operated simultaneously and selectively with the printing mechanism. The central drive of the drum shaft enables the construction to be simple and facilitates convenient manipulation.

In order to keep the apparatus as small as possible the printing mechanisms are arranged one behind the other so that they come into operation one after the other.

As a feature of this invention the drum containing the printing mechanisms is so connected to its driving means, e. g. a crank arm, that the one printing mechanism prints the head and the general remarks on the next ticket remaining in the apparatus and the other printing mechanism the special remarks on the ticket prepared in this manner.

The printing and counting mechanisms are arranged in separate drums which are geared directly and positively together through pinions. In addition to these drums, the apparatus contains only an ink roll and a paper roll. The assembled apparatus comprises therefore principally only the two drums mentioned.

In the accompanying drawings, Fig. 16 is a plan of a printed ticket after issuing from the apparatus.

In the form shown, the apparatus is designed for use by street car conductors, and is fastened to the body through straps attached to the rings 1 and 2 at the top and rear of the casing and to the button 3 at the bottom thereof.

Figure 7:
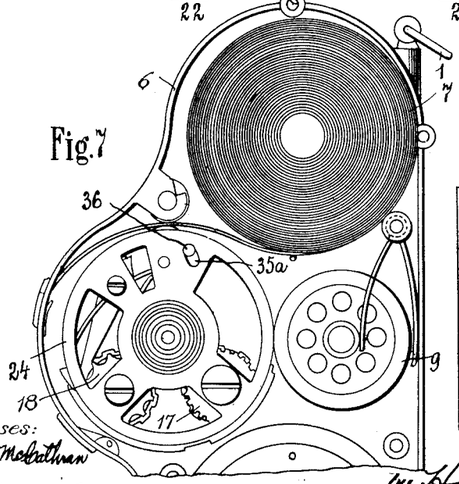
Fig. 7 is a side elevation corresponding to Fig. 4 with the frame plate removed.

For adjusting to price, place of departure, direction, hour, quarter of an hour, transfer station, etc., upon the ticket, adjusting indicator knobs 101—106 are arranged on each side of the apparatus. The crank 5 is arranged to be operated by the right hand. The apparatus can be opened at two points by the conductor, at the one point through the hinged front plate 6 (Fig. 2) which permits the insertion of a fresh paper roll 7 (Fig. 7) and at the other through a hinged rear plate 8, through which the ink roll 9 may be inserted or removed. The front plate is normally held closed by the spring latch 10, controlled by the buttons 11, while the rear plate 8 is freed by turning down the handle 12. In addition the face of the apparatus has three openings 13, 14 and 15. The ticket is discharged through the first of these beneath the sawedged tearing blade 16. The second opening 14 which is normally closed, may be opened to have access to the type wheels which print the date. This is preferably done by a supervising official at the car barns. Through the third opening 15 the different counting mechanisms are visible.

Figure 5:
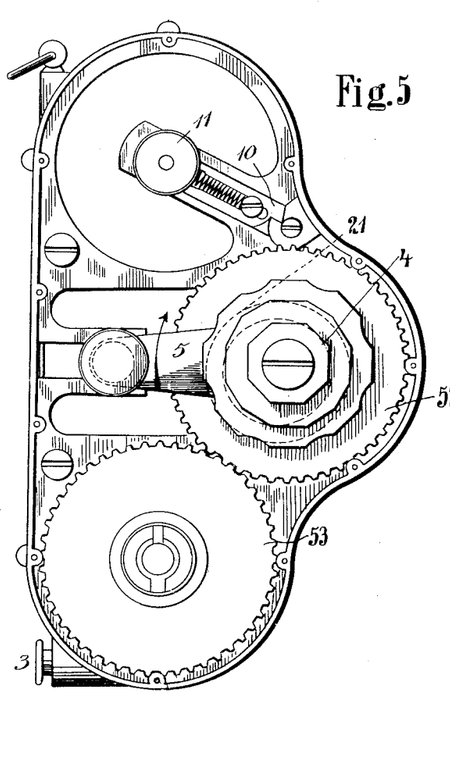
Figure 6:
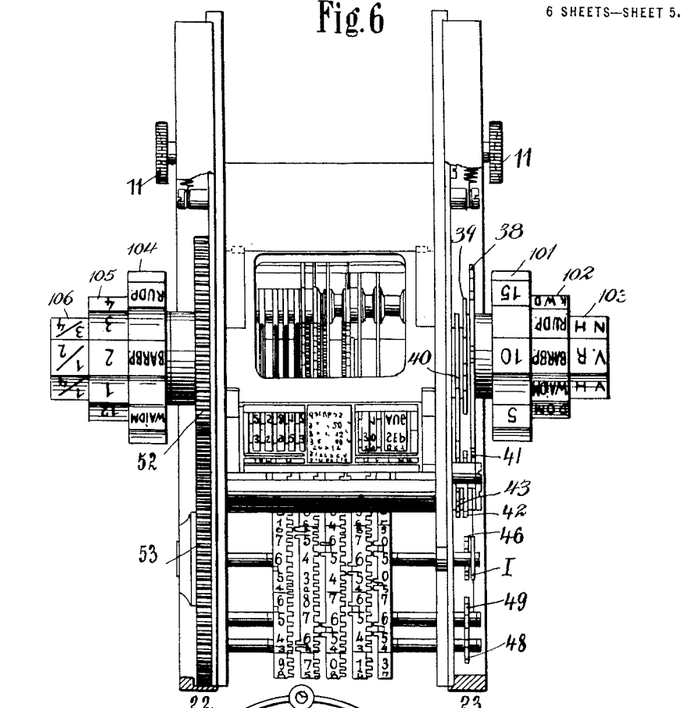
Fig. 6 is a front elevation with the front housing removed.
Figures 8, 10:
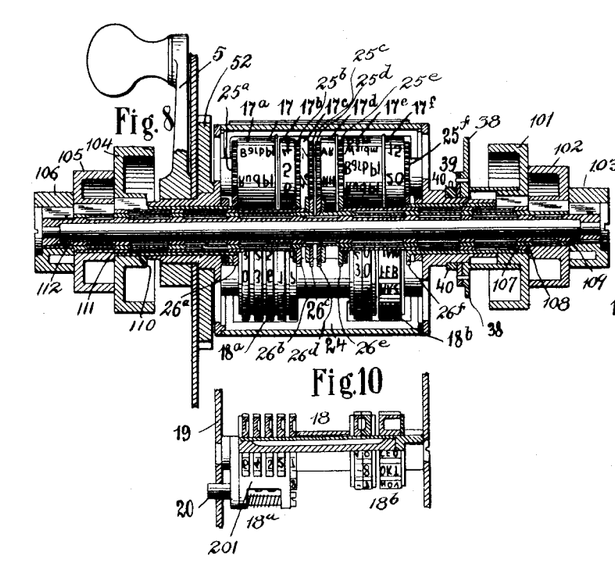
Fig. 8 is a longitudinal section through the drum containing the printing mechanisms.
Fig. 10 is a longitudinal section through one of the printing mechanisms, partly in section.
Figure 9:
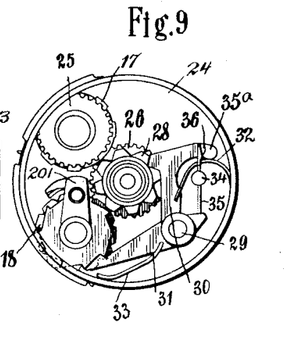
Fig. 9 is a side elevation of the same drum with the end plate of the drum removed.

As illustrated in Figs. 8 and 9 two separate printing mechanisms 17 and 18 are arranged within the drum 24, the lower of which is separately shown in Fig. 10. This prints upon the ticket (Fig. 16) the serial number thereof, and the date. While the date type wheels 18$^b$ are set by hand through the opening 14 in the casing, the serial number type wheels 18$^a$ are actuated automatically through a pin 20 (Fig. 10) which projects through a cam slot 21 (Fig. 5) in one of the side frames 22—23 (Fig. 6). The pin 20 is fast with the ratchet pawl 201 (Fig. 10) which is of known construction and is operatively connected in known manner with the serial numbering wheels 18$^a$. When the drum 24 is rotated by the crank 15, the pin moves through the cam slot 21 (Fig. 5) and is consequently shifted inward and again outward once on a single revolution of the drum. This motion advances the unit wheel of the counters 18$^a$ a single step.

The position of the separate type wheels 17$^a$, 17$^b$, 17$^c$, 17$^d$, 17$^e$ and 17$^f$ of the printing mechanism 17 is controlled through pinions 25$^{a-b}$ thereon, meshing with pinions 26$^{a-f}$ (Fig. 9) mounted on the inner ends of concentrically arranged sleeves 107—112, on the outer ends of which are carried the indicator adjusting knobs.

In order to hold the wheels 17 in proper position during printing, star wheels 28 are made fast to the pinions 26, which are engaged by pawls 30 pivoted on a shaft 29 fast in the ends of the drum 24. On the same shaft are pivoted pawls 31 for the type wheels 18. Both groups of pawls 30 and 31 are subjected to the action of springs 32, 33 respectively, which are carried thereby and bear at their outer ends against the shell of the drum 24.

Figure 4:
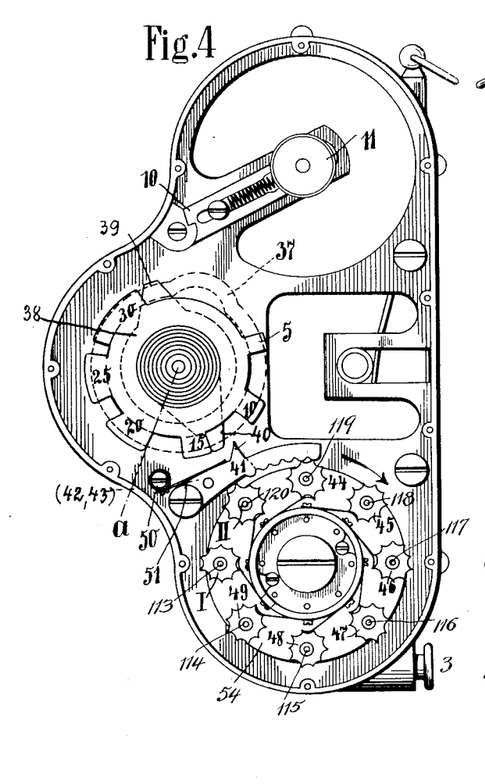
Figs. 4 and 5 are opposite side elevations of the apparatus with the side housings removed.

In order to hold the printing wheels stationary during the printing operation, a stop 35, fixed to a rotatable shaft 34, is provided, the ends of which simultaneously engage the pawls 30 and 31. The stop 35 is normally held in engaging position by the springs 32 and is moved out of this position by pins 36 carried thereby and passing through slots 35$^a$ in the drum ends into cam slots 37 (Fig. 4) in the side frames 22 and 23. These slots 37 are circular around the drum axis with the exception of the cam bows, during the traverse of which the pins 36 move away from the axis of the drum thus freeing the pawls 30 and 31 (Fig. 9). The pins 36 are positioned in the cam portion of the slot 37 at the time the crank 5 (Figs. 2 and 5) is in its initial position. In this position therefore the adjusting knobs can be turned to proper position, while they are fixed directly after the beginning of the rotation of the crank 5, because the stop 35 is moved into locking position by the movement of the pins 36 in the cam slots 37.

Figure 1:
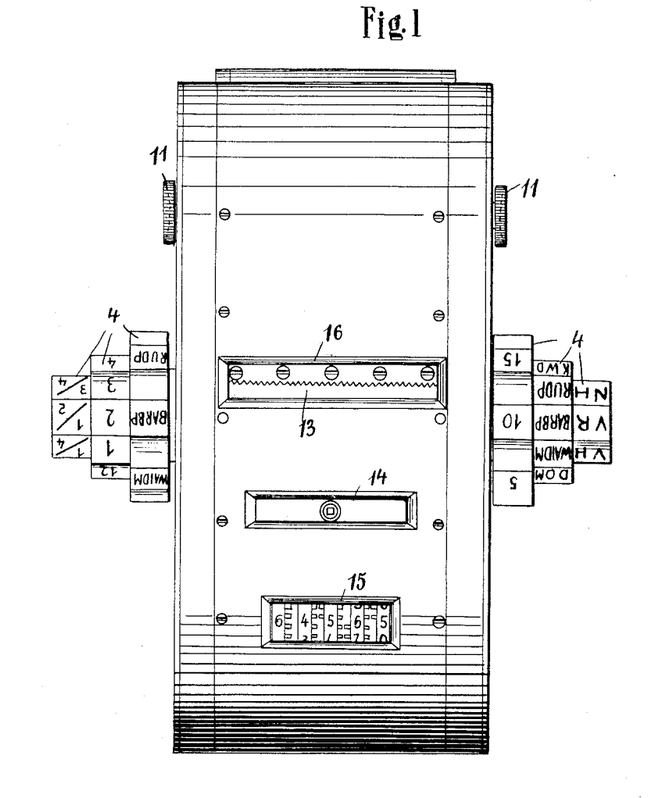
Figures 1 to 3 are respectively front, side and rear elevations of the apparatus.
Figures 2, 13, 14:
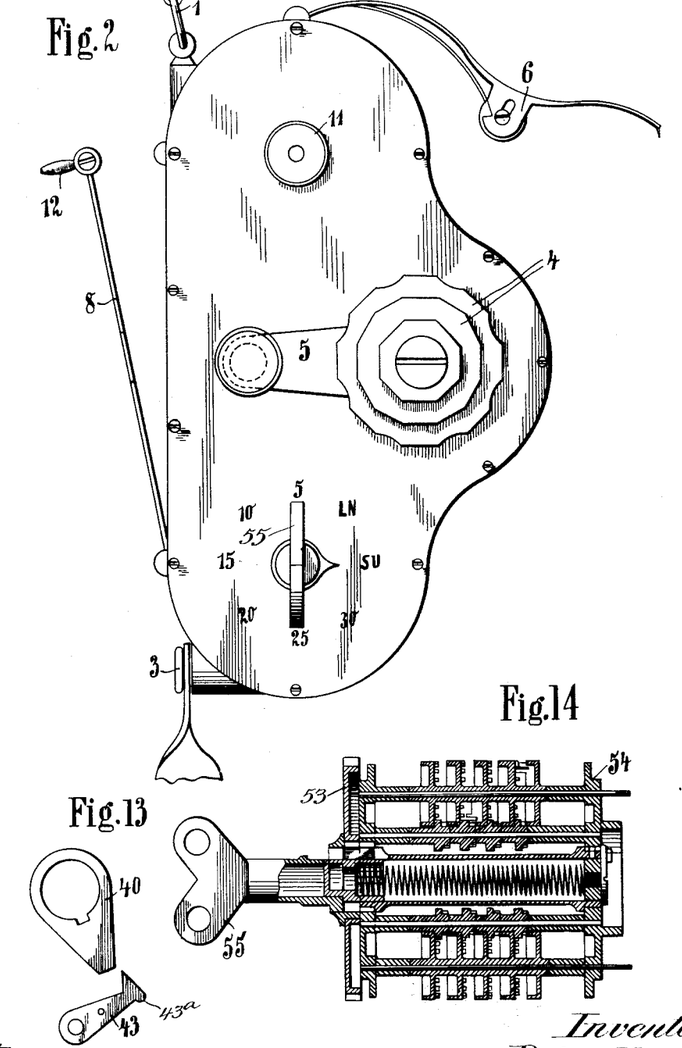
Figs. 11-13 are side elevations of the cams and pawls which drive the separate counting mechanisms.
Fig. 14 is a longitudinal section through the ticket drum containing the counting mechanisms.
Figure 3:
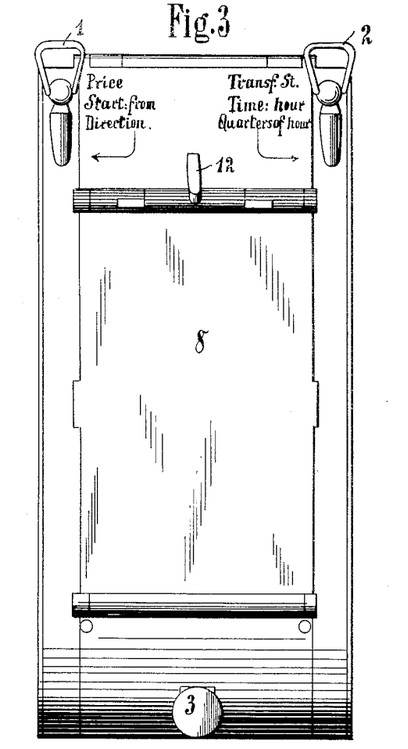
Figures 11, 12:
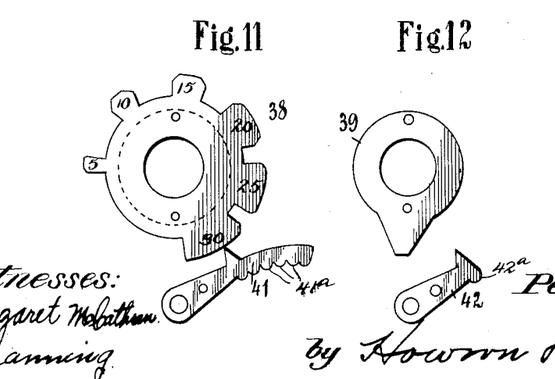

In Fig. 8 the knob for adjusting the price printing type wheel is indicated by the reference 101. Fast with this knob and with each other are two cam plates 38 and 39 (Figs. 11 and 12) while a third cam plate 40 (Fig. 13) is fixed on the hub of the drum head at the right end of Fig. 8, so that this cam plate cannot rotate relative to the drum. These three cams operate the three pawls 41, 42, 43, which are drawn by springs 51 fixed to a pin 50 (Fig. 4) of the side frame 23 toward the pawls. The pawl 41 is provided with a toothed shank, while pawls 42, 43 are of the same shape, as illustrated in Figs. 12 and 13. The two pawls 42 and 43 are not shown in Fig. 4, because covered by the pawl 41. These three pawls in turn engage the separate operating wheels pertaining to the counters, which wheels are positioned for this purpose in the same plane as the pawls, by which they are operated. The pawl 42 influenced by the cam 39 coöperates with the six driving wheels 44 to 49 (Fig. 4) which control the registering of tickets of the value of 5, 10, 15, 20, 25, and 30 cents. The pawl 42 lies therefore in the same plane as these six wheels. The pawl 43 influenced by the cam 40 lies in the plane of and coöperates therefore with the driving wheel II, the counter of which counts the revolutions of the crank 5. The toothed pawl 41 influenced by the cam plate 38 coöperates with the driving wheel I the counter of which counts the total cash intaken. Therefore for example, for one ticket issued for 30 cents there must be a registry three times as great as for a ticket issued for 10 cents. For this purpose the cam plate 38 is provided with a series of cams in the example illustrated, six cams to correspond with the 5, 10, 15, 20, 25 and 30 cent tickets, these cams being of different extent so that they hold the pawl 41 in engagement with the actuating wheel I a varying length of time depending upon which of the cams is in engagement with the pawl. Whereas in the counting mechanisms of the driving wheels 44 to 49 inclusive and II an indication of ten is automatically effected after the advance of ten units, a similar indication will be effected in the case of counting mechanism I after every second advance corresponding to the indication of the amounts of the fares which differ from each other by five cents.

The drum 24, containing the printing wheels (17ᵃ, 17ᵇ 17ᶠ, and 18ᵃ, 18ᵇ) and the drum 54, containing the registering mechanisms (1, 11, 44, 45 49) are geared together by the pinions 52 and 53 in such manner that they rotate with the same speed but in opposite directions. The crank 5 is rigid with the drum 24.

The cam plates 38 and 39 are rigidly connected to the knob 101 which adjusts the printing wheel 17ᶠ for printing the price (15 in Fig. 16) on the ticket. The knob 101 is fixed on a tube 107, provided on its inner end with a pinion 26ᶠ, gearing with the pinion 25ᶠ, of the said printing wheel 17ᶠ which prints the price ("15" in Fig. 16). Each pinion 26 is provided, as previously explained, with a star wheel 28, which is locked in its position, after adjustment and during the printing operation, by the pawl 30, thus holding both the cams and the printing wheels solid during their operation.

The knob 102 is fixed on a tube 108, on the inner end of which is fixed the pinion 26ᵉ, gearing with the pinion 25ᵉ of the printing wheel 17ᵉ which prints the station ("Dom" in Fig. 16) at which the journey is initiated.

The knob 103 is fixed on a tube 109, on the inner end of which is fixed the pinion 26ᵈ, gearing with the pinion 25ᵈ of the printing wheel 17ᵈ printing the direction of travel. ("N R" in Fig. 16).

The knob 104 is fixed on a tube 110 on the inner end of which is fixed the pinion 26ᵃ gearing with the pinion 25ᵃ of the printing wheel 17ᵃ, printing the transfer station (K. W. D. in Fig. 16).

The knob 105 is fixed on a tube 111, on the inner end of which is fixed a pinion 26ᵇ gearing with the pinion 25ᵇ of the printing wheel 17ᵇ, printing the hour at which travel begins ("5" in Fig. 16).

The knob 106 is fixed on a tube 112, on the inner end of which is fixed a pinion 26ᶜ gearing with the pinion 25ᶜ of the printing wheel 17ᶜ, printing the quarter hours ("1 4" in Fig. 16).

The cam plates 38 and 39 are set in different positions with regard to the drum, according to the different price of the tickets.

For each price a special registering mechanism is provided: for 5 cents the mechanism on the axle 119 having the gear 44, for 10 cents the mechanism on the axle 118 having the gear 45, for 15 cents the mechanism on the axle 117 having the gear 46, for 20 cents the mechanism on the axle 116 having the gear 47, for 25 cents the mechanism on the axle 115 having the gear 48, for 30 cents the mechanism on the axle 114 having the gear 49.

If a ticket of the value of 25¢ is demanded, the conductor sets the cams 38 and 39 by means of the knob 101 in such position, that on the rotation of the handle 5, the cam 39 presses down the nose 42ᵃ of the pawl 42 at the moment when the wheel 48 of the registering mechanism on the axle 115 is under the nose 42ᵃ of the pawl so that this registering mechanism is advanced one unit.

The cam 38 has six projections of different length increasing in accordance with the amount 5, 10 30 cents, which they are designed to record. At the same moment that the cam 39 actuates the pawl 42, one of the projections 38 (here that corresponding to a 25¢ fare) presses down the pawl 41 and maintains it in this depressed position during the engagement of five of the teeth 41ᵃ on its lower face with the pinion I. The registering mechanism operated by the pinion I, thus records the amount of the fare for all tickets issued and serves as a totalizer.

The cam 40 is rigidly connected with the drum 24 and operates the pawl 43 on each revolution of the drum at the moment that the pinion II of the registering mechanism on the axle 120 is in operative position with relation to the pawl 42. This registering mechanism is therefore actuated on each revolution of the crank 5 and shows the total number of the tickets issued by the conductor. On rotation of the drum 24 the printing wheels and the printing plates, printing the titles of the columns of the ticket and the like, are inked by the inking roller 9 and print on the ticket in known manner.

To avoid the necessity of rotating the crank 5 when reading off the numbers indicated by the several counting mechanisms, the gear wheel 53 mounted on the shaft of the drum of the counting mechanism may be uncoupled from the drum by a key 55 which is normally in the possession of the tramway officials and not the conductor and by means of which the drum can be rotated freely. This uncoupling device forms no part of this invention however.

Instead of being arranged on both sides of the apparatus the setting knobs may all be placed on one side only if desired.

Apparatus as hereinbefore described is suitable without any modification for issuing cards of admission or tickets for concert halls, kinematograph theaters, or to any place where the prices of admission are not too varied and the seats are not numbered. The apparatus is particularly suitable for issuing tickets for kinematograph theaters, as by the printing of the time on the tickets it is easy to determine, in case of any dispute, whether a certain period of time for which the ticket is issued, has expired or not. In such applications the apparatus may be conveniently mounted upon a foot or stand off which it can however be easily taken for the purpose of inserting a fresh inking roller.

Figure 15:
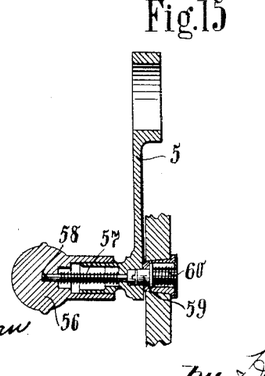
Fig. 15 is a longitudinal section of the crank handle.

For securing to the crank 5 a definite initial position the handle 56 of the crank is slidable in the axial direction. This crank contains a bolt 58 fixed to the handle 56 and provided with a spring 57. Projecting from the side plate of the apparatus is a pin 59, which is influenced by a spring 60 and always projected into its normal position. The crank 5 is provided with an opening (not shown) at one side of the head of the pin 59, to allow the pin 59 to go under the bolt 58.

In order to rotate the crank the handle 56 must be pressed down. Thereby the bolt 58 presses down the pin 59 which allows the crank to pass by. In rotating, the handle 56 returns to its initial position. After a full revolution of the crank the pin 59 pushes the crank 5, determining thereby the end position of it.

Having now particularly described and ascertained the nature of the said invention and in what manner the same is to be performed I declare that what I claim is:

1. In apparatus for printing, registering and delivering tickets, a pair of drums geared together, printing mechanisms carried by one of said drums and registering mechanisms carried by the other, said former drum comprising at each end adjusting knobs and gearing connecting the same to the printing mechanisms, together with means for locking said gearing during the printing operation.

2. In apparatus for printing, registering and delivering tickets, a pair of drums geared together, printing mechanisms carried by one of said drums and registering mechanisms carried by the other, together with a series of cams moving with the former drum for actuating the registering mechanisms said series including a cam plate with a series of different sized cams thereon, a geared pawl subject to the action thereof, and an actuating gear of one of the registering heads, lying in the plane of said geared pawl but normally out of engagement therewith.

3. In apparatus for printing, registering and delivering tickets, a pair of drums geared together, printing mechanisms carried by one of said drums and registering mechanisms carried by the other, together with a series of cams moving with the former drum on the rotation thereof certain of said cams being rotarily adjustable with relation to the printing drum for varying the register according to the ticket issued, and operative connections arranged between said cams and registering mechanisms whereby the latter are actuated by said cams upon the rotation of the printing drum.

4. In apparatus for printing, registering and delivering tickets, a pair of drums geared together, printing mechanism carried by one of said drums, registering mechanism carried by the other, cams rotatably mounted on the axis of said printing drum, gearing operatively controlled by said cams to actuate said registering mechanisms and means to lock the printing wheels in their adjusted positions on the rotation of said drums.

5. In apparatus for printing, registering and delivering tickets, a pair of drums geared together, printing mechanism carried by one of said drums, registering mechanism carried by the other, said registering mechanism comprising a series of registering heads each representing a different value and adapted to be advanced but a single unit on one complete revolution of the drums, a cam rotatably mounted on the axis of the printing drum and operatively controlling the actuation of one or the other of said series of registering heads according to adjustment, and means to lock the printing wheels in their adjusted positions during the rotation of the drums.

6. In apparatus for printing, registering and delivering tickets, a pair of drums geared together, printing mechanism carried by one of said drums, registering mechanism carried by the other, said registering mechanism comprising a series of registering heads each representing a different value and adapted to be advanced but a single unit on one complete revolution of the drums, a totalizing registering head and cams rotarily adjustable upon the axis of the printing drum operatively controlling the actuation of said totalizing registering head and one or the other of said series of registering heads according to adjustment and means to lock the printing wheels in their adjusted positions.

7. In apparatus for printing, registering and delivering tickets, a pair of drums geared together, printing mechanism carried by one of said drums, registering mechanism carried by the other, said registering mechanism comprising a totalizing head, gearing for actuating the same on the rotation of the drum, said gearing being normally held in inoperative position, a cam wheel rotatably mounted on the axis of the printing drum, and cams thereon of different extent for holding said gearing in operative position a longer or shorter period to effect the registering of a greater or less total depending upon the adjustment of said cam wheel, and means to lock the printing wheels in their adjusted positions during the rotation of said drums, substantially as described.

8. In apparatus for printing, registering and delivering tickets, a pair of drums geared together, printing mechanism carried by one of said drums, registering mechanism carried by the other, said registering mechanism comprising a totalizing head, a pinion on said totalizing head, a rack pivoted on the frame of the apparatus and normally out of gear with said pinion, a cam wheel on the axis of said printing mechanism and comprising a series of different sized cams engaging said rack to hold the latter in operative engagement with said pinion to effect a greater or less registering on said totalizer varying with the adjustment of said cam wheel, and means to lock the printing wheels in their adjusted positions during the rotation of said drums, substantially as described.

9. In apparatus for printing, registering and delivering tickets, a pair of drums geared together, printing mechanism carried by one of said drums, registering mechanism carried by the other, said registering mechanism comprising a registering head for recording each revolution of the drums, a series of registering heads each representing a different value and a registering head for totalizing the valuation, in combination with gearing for actuating said registering heads, said gearing being normally in inoperative position and cams on the axis of the printing drum for moving said gearing into operative position to actuate said registering heads on the rotation of the drums, substantially as described.

10. In apparatus for printing, registering and delivering tickets, a pair of drums geared together, printing mechanism carried by one of said drums, registering mechanism carried by the other, said registering mechanism comprising a registering head for recording each revolution of the drums, a series of registering heads each representing a different value and a registering head for totalizing the valuation, in combination with gearing for actuating said registering heads, said gearing being normally in inoperative position and cams on the axis of the printing drum for moving said gearing into operative position to actuate said registering heads on the rotation of the drums, the cams moving the gearing into operative position for the registering heads of different value and the totalizing head, being adjustably mounted on the axis of the printing drum, for the purpose described.

In testimony whereof I have signed my name to this specification, in the presence of two subscribing witnesses.

PETER MEYER.

Witnesses:
LOUIS VANDORN,
THERESA THRANBEREND.

Copies of this patent may be obtained for five cents each, by addressing the "Commissioner of Patents, Washington, D. C."